US005607085A

United States Patent [19]

Cooper

[11] Patent Number: 5,607,085

[45] Date of Patent: Mar. 4, 1997

[54] TAMPER PROOF VENDING MAHCINE WITH INTERCHANGEABLE PRODUCT COMPARTMENTS

[75] Inventor: Douglas Cooper, Brentwood, N.Y.

[73] Assignee: Vendstar, Inc., Bay Shore, N.Y.

[21] Appl. No.: 602,915

[22] Filed: Feb. 16, 1996

Related U.S. Application Data

[63] Continuation of Ser. No. 134,094, Oct. 8, 1993, abandoned.

[51] Int. Cl.[6] .......... G01F 11/10

[52] U.S. Cl. .......... 222/153.03; 222/153.09; 222/325; 222/349; 222/370

[58] Field of Search .......... 222/153.01, 153.02, 222/153.03, 153.09, 370, 345–350, 325

[56] References Cited

U.S. PATENT DOCUMENTS

| | | | |
|---|---|---|---|
| 815,882 | 3/1906 | Tucker | 222/350 |
| 1,834,721 | 12/1931 | Mitchell | 222/348 |
| 1,839,697 | 1/1932 | Norris | 222/350 X |
| 1,970,686 | 8/1934 | Bolen | 222/349 X |
| 2,129,185 | 9/1938 | Simmons | 222/348 X |
| 2,154,443 | 4/1939 | French | 222/350 X |
| 2,532,204 | 11/1950 | Stover | 222/153 X |
| 2,537,317 | 1/1951 | Probasco | 222/153 |
| 2,627,362 | 2/1953 | Balaz | 222/153 X |
| 2,680,540 | 6/1954 | Probasco | 222/370 X |
| 2,846,122 | 8/1958 | Jenkins et al. | 222/153 |
| 5,114,047 | 5/1992 | Baron et al. | 222/214 X |

*Primary Examiner*—Kevin P. Shaver
*Attorney, Agent, or Firm*—Collard & Roe, P.C.

[57] ABSTRACT

A coin-operated multi-product vending machine which may vend products such as small candies, gumballs, peanuts, cashews, M & M's and the like has one or more stand-alone, interchangeable product compartments which may easily be filled with product and installed on the vending machine. The vending machine is also provided with means for discharging the product from the product compartments in a controlled manner with out crushing or otherwise damaging the product. A security cover is also provided which when installed interlocks with the product compartments and other components of the vending machine to prevent removal.

4 Claims, 6 Drawing Sheets

TAMPER PROOF VENDING MAHCINE WITH INTERCHANGEABLE PRODUCT COMPARTMENTS

This is a continuation of application Ser. No. 08/134,094 filed on Oct. 8, 1993, now abandoned.

BACKGROUND OF THE INVENTION

1. Field of the Invention

The present invention is related to the field of stand-alone vending machines, such as those conventionally used to vend round gum balls, M & M's, peanuts, cashews and other like food products. More particularly,the present invention is related to a vending machine with improved tamper resistance and with independent, interchangeable product compartments.

2. Description of the Prior Art

Small, stand-alone, vending machines such as those conventionally used to vend gum balls, peanuts and other like food products, have been in use for many years. These devices, while they take different external forms, are typically fitted with a clear glass or plastic compartment or compartments which retain the product to be vended. The compartments are positioned over a aperture containing plate, which plate may be rotated, when the vending machine is operated, to position the aperture under a discharge opening provided in the compartment. The rotating plate may contain one or more apertures to facilitate discharge of the product. The typical vending machine also has associated therewith a coin box for the receipt of the cost of the product to be discharged.

In operation, a coin or coins is inserted in an external slot provided on the vending machine, which insertion allows a handle, having rotation about a horizontal access, to rotate. The handle is affixed to a gear which meshes with the aforementioned rotating plate. When the handle is rotated after the insertion of a coin, the rotating plate is caused to rotate such that the aperture contained in the plate is positioned between the discharge opening in the product compartment and a discharge chute provided in the machine which chute discharges the product through an external opening in the machine making the product available for receipt by the vending machine user.

While the devices know in the art have worked well and continue to work well for their intended purpose they do suffer from several defects when subject to the modern use. One such defect is the inability of most of the known machine to vend more than one product. Many of the known vending machines have only one compartment and therefore can only vend one product at a time, requiring several separate vending machines at a location that desires more than one product.

Even in the known vending machines that will vend more than one product, the different product containing compartments are interconnected in a way that results in the disturbance and possible contamination of the products or products when one or more of the products contained in the machine must be replaced or changed.

In addition, it is often the case that before one of the products is completely consumed, the user requests another product. In most of the prior devices, this may require human handling of the product to be removed resulting in the possible loss of product or the inability to re-use the unused and returned portion.

Furthermore, the product to be dispensed from the prior art devices may be frictionally engage by the rotating aperture containing plate and moved or shifted without being discharged. This will often result in the product be crushed or otherwise damaged leaving an unappealing impression on subsequent users of the device.

Finally, vending machines of the type referred to herein have been the target of vandal and others attempting to gain access to the product or coin box contained in the vending machine. This may result in loss of product or profit and at the very least results in a damaged and inoperable machine.

Therefore, it is an object of the present invention to provide a product vending machine which will display and vend a plurality of products.

It is yet another object of the present invention to provide a vending machine which allows for the easy interchange of products to be vended.

It is yet another object of the present invention to provide a vending machine which avoids the contamination of vended product when on or more of same are changed or replenished.

It is yet another object of the present invention to provide a vending machine having separate storage compartments which may be easily installed, removed, replaced, shipped to the user's location and otherwise stored.

It is still another object of the present invention to provide a vending machine which has improved tamper resistance.

It is still another object of the present invention to provide a vending machine which causes little or no damage to the product vended.

These and other objects of the present invention will become apparent from the following specification read together with the attached drawings.

SUMMARY OF THE INVENTION

The above referenced objects of the present invention are accomplished by a product dispensing apparatus comprised of a generally rectangular dispenser housing having one or more opening in the top thereof and further having one or more openings in the front of the housing. A rotatable handle having a generally horizontal axis of rotation is mounted to the front of said housing adjacent to each front opening. A product chute mounted inside said housing is also provided in the present invention which chute communicates between each of the top openings and each of the front openings.

Furthermore, one or more stand-alone, independent food product compartments are provided that may be removably engaged over each of the top openings of the vending machine housing which compartment contains the food product to be vended. The product containing compartment defines an opening in the bottom thereof which bottom opening communicates with said chute when said compartment is engaged over said top housing opening such that product to be vended may pass from said compartment, through the chute and is discharged out of the vending machine of the present invention through the opening defined in the front of the dispenser housing.

The product compartments of the present invention are further provided with compartment discharge means which means are operably engaged with said handle such that when said handle is operated the discharge means allows a predetermined amount of product to pass out of said bottom compartment opening and into said chute for discharge from the vending machine of the present invention. In a preferred embodiment of the present invention, the compartment discharge means are provided with anti-crushing means which prevents the vended product from being crushed or otherwise damaged when discharged. The present invention further comprises a security cover attached to the back of the dispenser housing which cover when secured to the housing engages the bottom edge of the food compartment, as well as the internal chute to prevent removal of same form the dispenser of the present invention. The cover is also provided with a key operated lock to secure the cover in place on the dispenser.

DETAILED DESCRIPTION OF THE INVENTION

Figure 1:
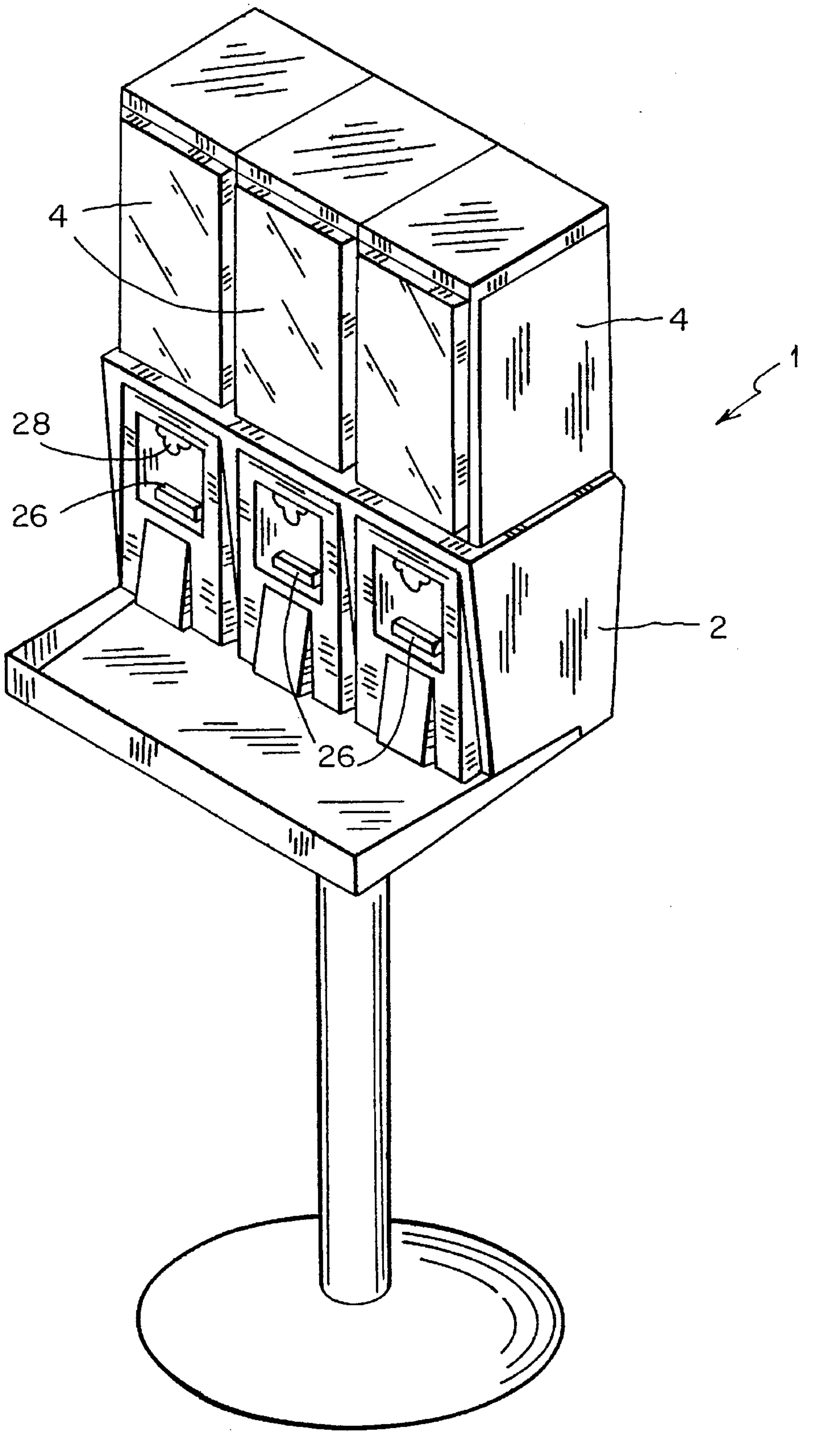
FIG. 1 is a perspective view of the vending machine of the present invention.
Figure 3:
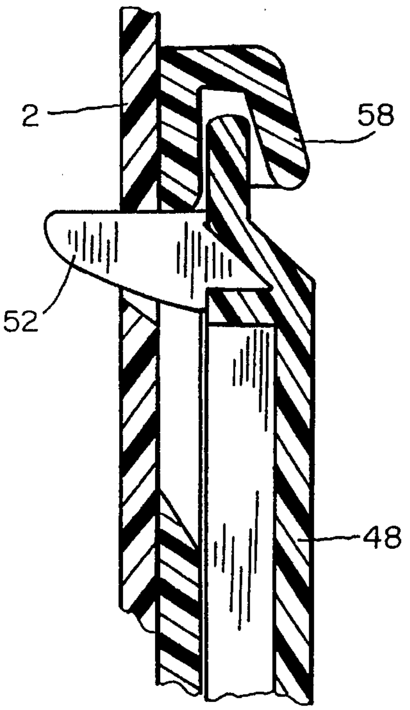
FIG. 3 is a cross-sectional view of the rear cover used in combination with the vending machine of FIG. 1.

Referring now to the drawings, a coin-operated product vending machine is shown in accordance with the present invention. The vending machine 1 is particularly suited for vending of food products such as gumballs, small candies, peanuts, cashews, M & M (reg. TM) and the like.

Figure 4:
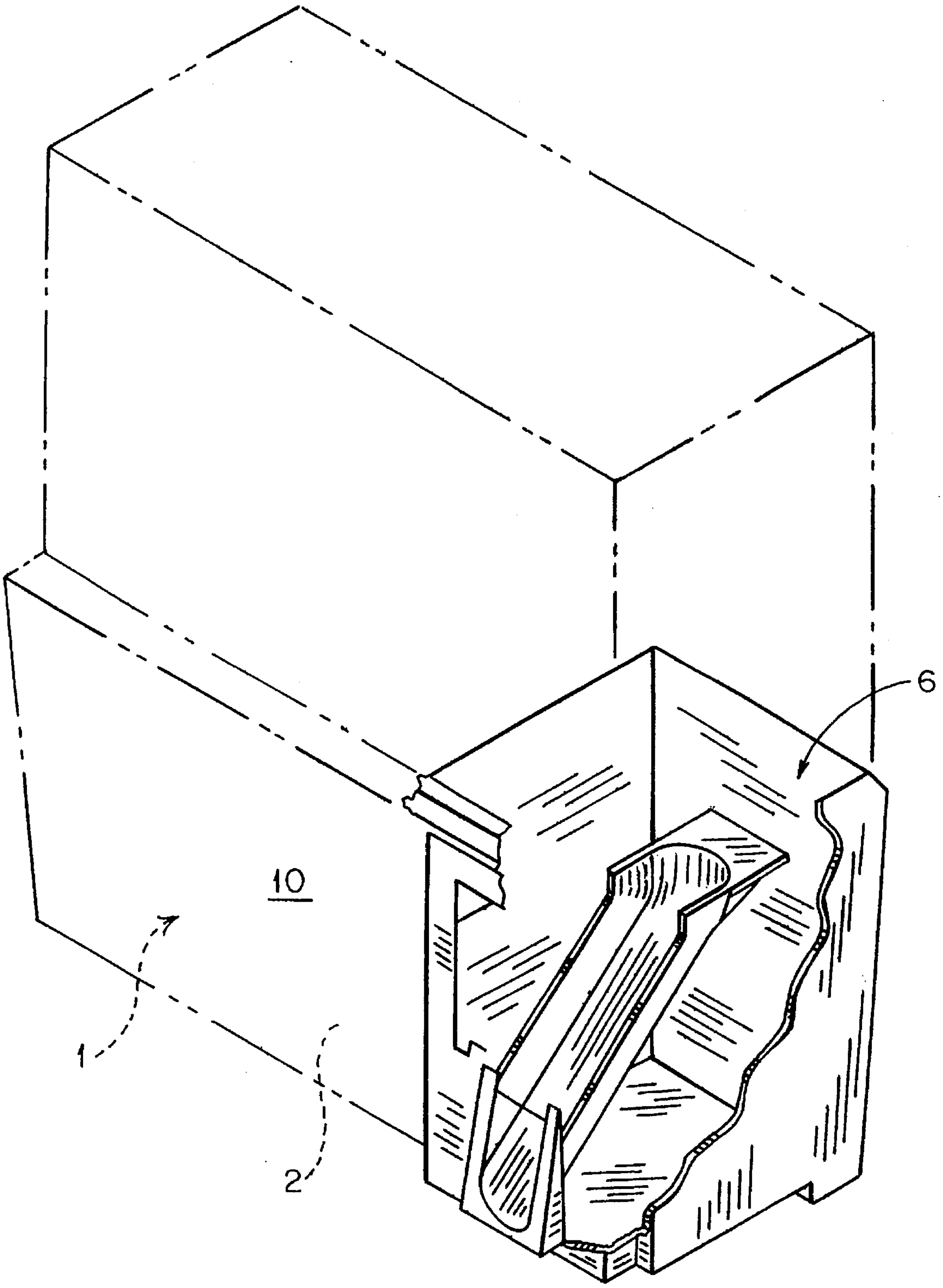
FIG. 4 is an internal view of a portion of the vending machine of FIG. 1.
Figure 5:
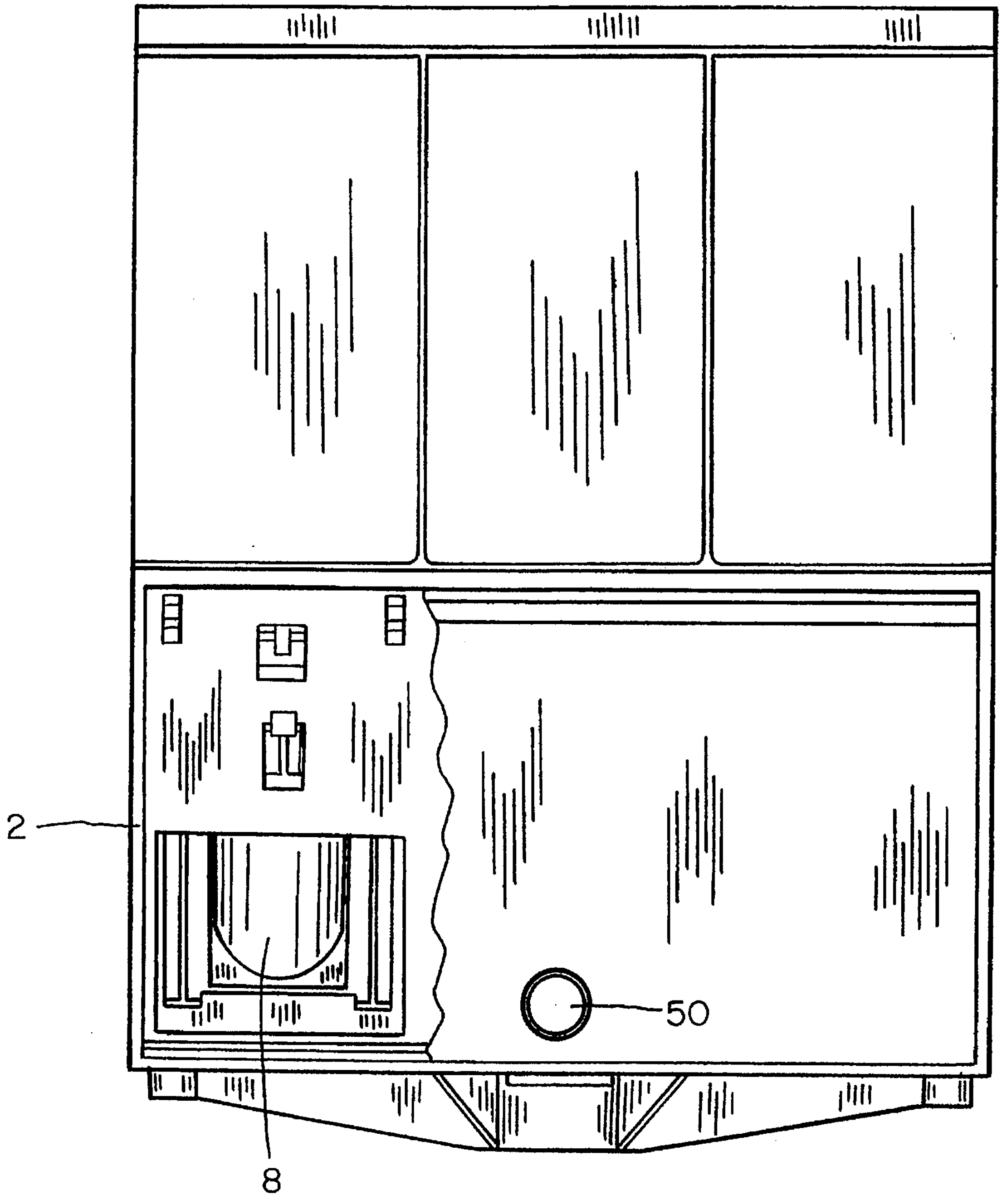
FIG. 5 is a front partially exploded view of the vending machine of FIG. 1.
Figure 6:
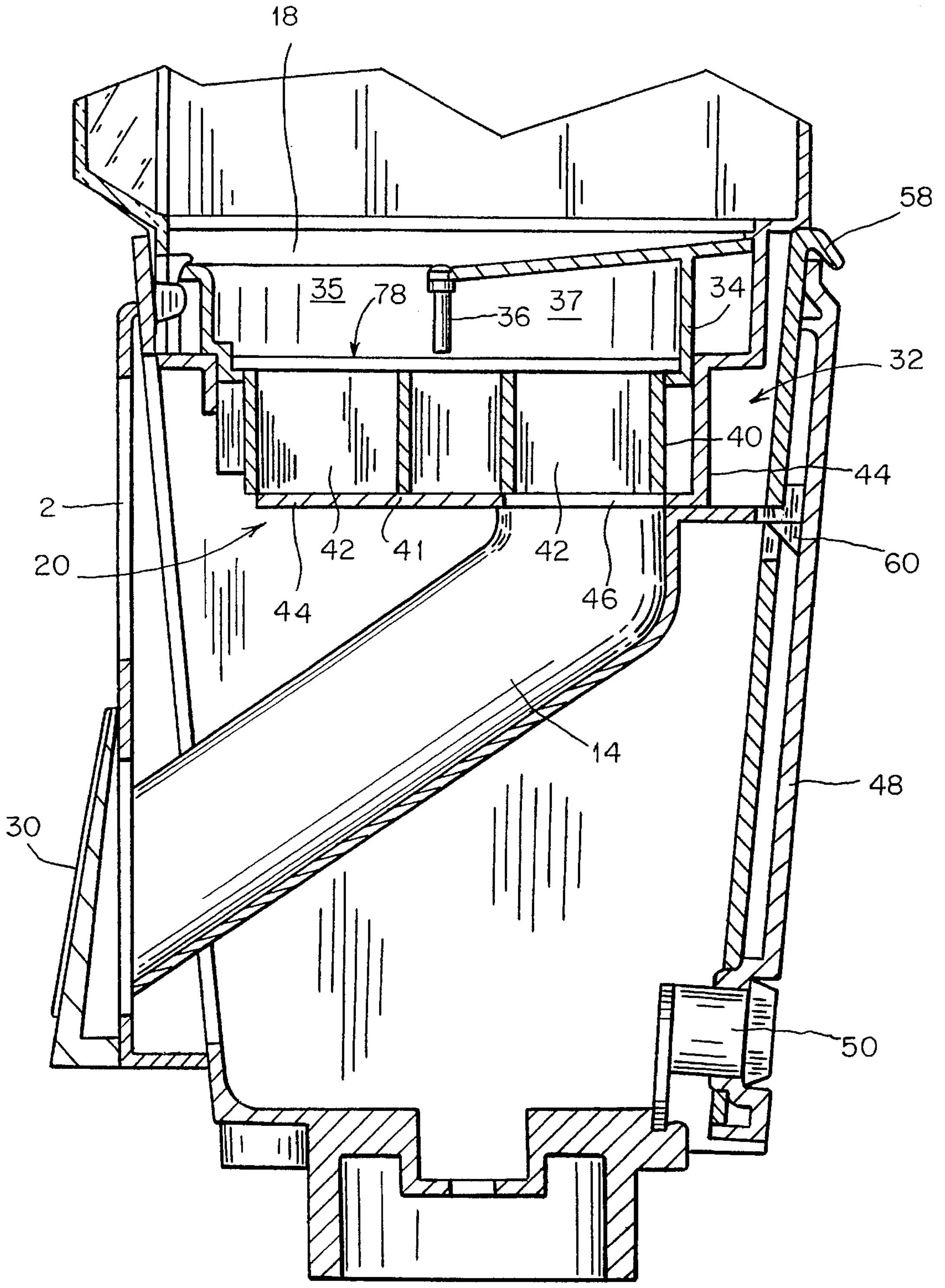
FIG. 6 is a internal view of the vending machine of FIG. 1; the vending machine of FIG. 1.
Figure 7:
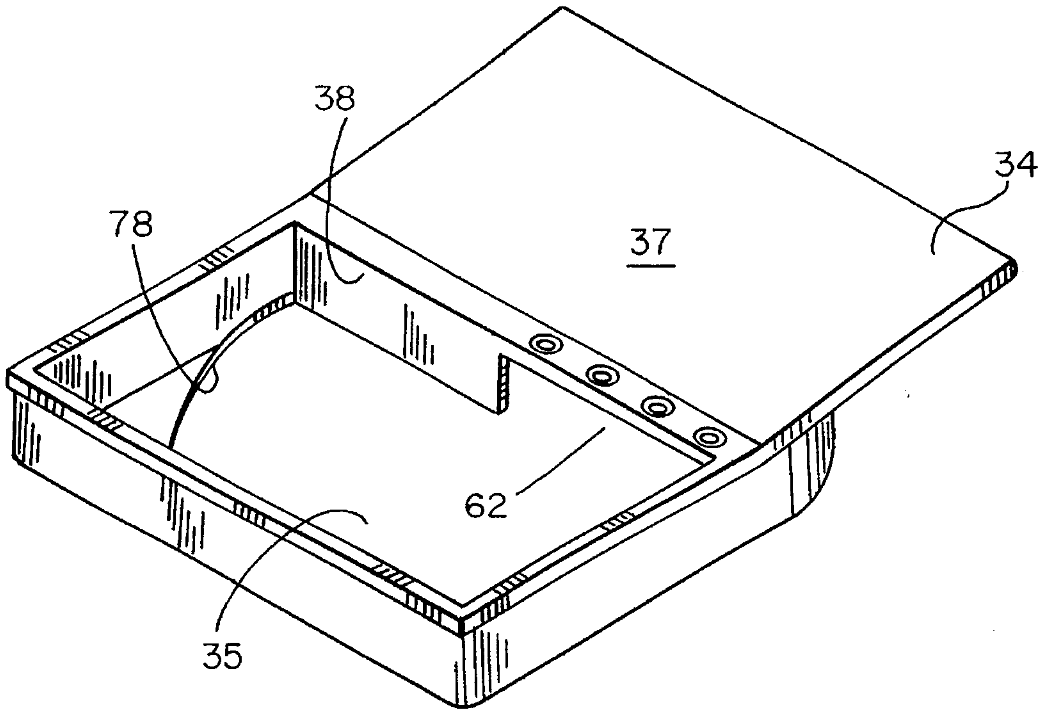
FIG. 7 is a perspective view of the discharge housing of the present invention.
Figure 8:
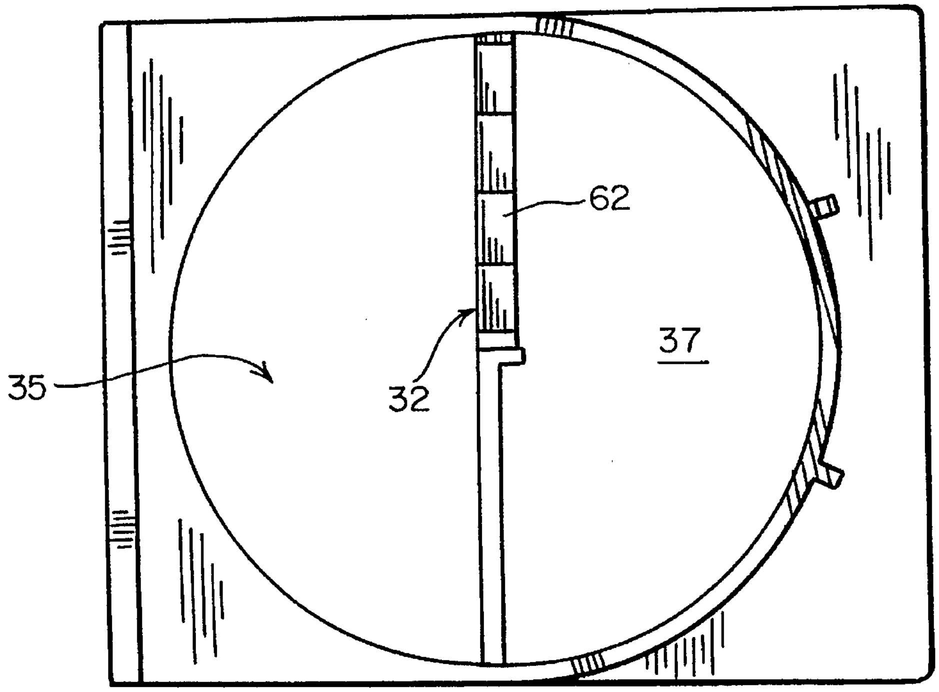
FIG. 8 is bottom view of the discharge housing of FIG. 7.

The present invention is shown, in general in FIG. 1. As shown therein, the vending machine 1 comprises a dispenser housing 2 and several stand-alone food product compartments 4. The vending machine may be provided as a table top unit (not shown) or provided with a stand 5. The housing defines one or more openings 6 in the top thereof (see FIG. 2.) as well as one or more discharge openings 8 positioned along the lower front face 10 of the housing 2. Finally, a chute 14 (FIG. 4) is provided which chute provides communication between the top housing openings 6 and the front housing openings 8 such that food product to be vended by the present invention may be discharged from the vending machine 1.

As shown, the vending machine is provide with three separate product compartments 4. However, within the scope of the present invention, a vending machine with a greater or lesser number of food compartment is contemplated. The storage compartments are made of high impact resistant plastic in order to reduce the chance of breakage. In addition, the compartments are transparent so that their contents may be easily viewed. Each of the compartments 4 define an opening 18 in the bottom thereof to allow for the charging and discharging of food product.

Figure 2:
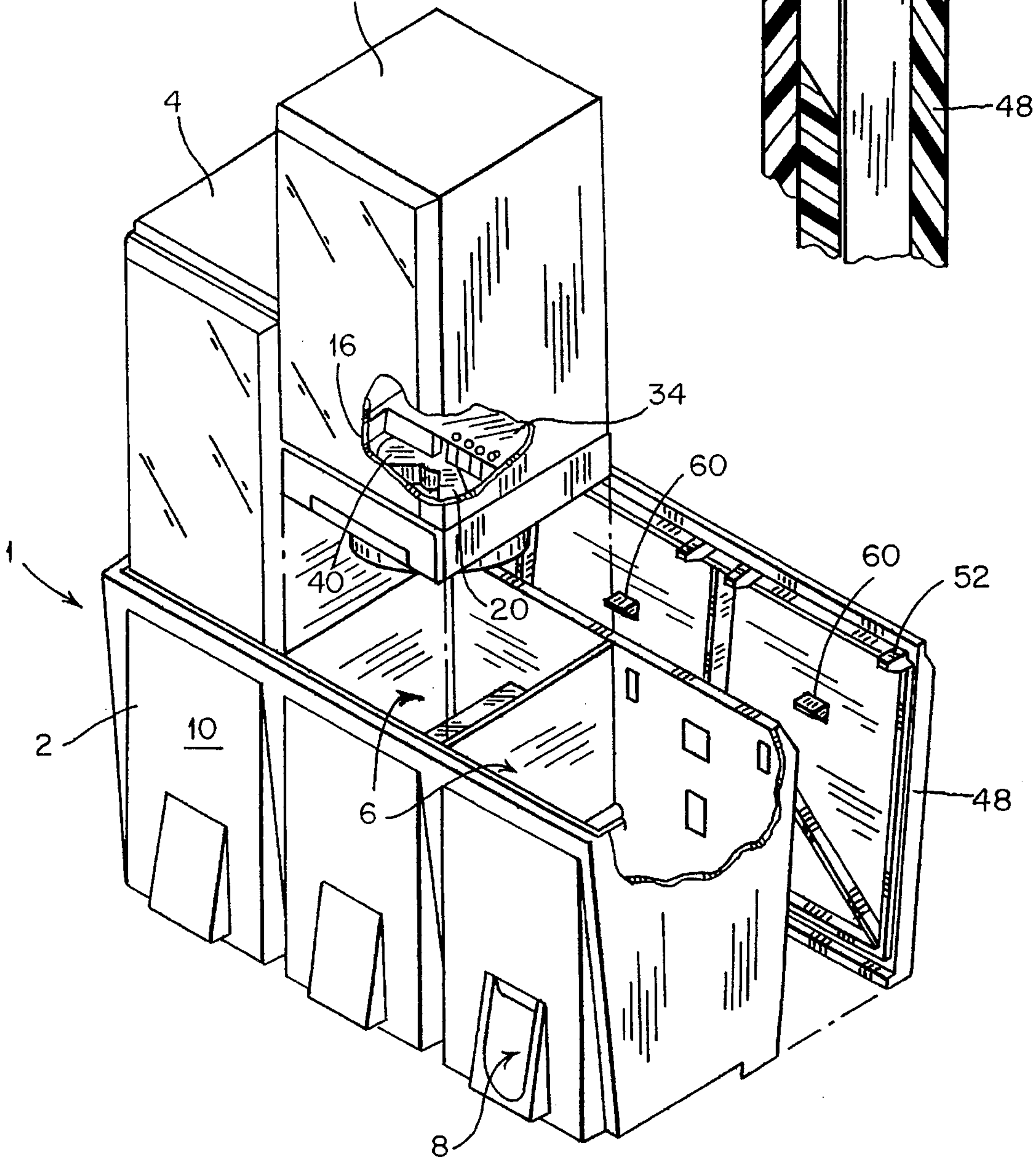
FIG. 2 is an exploded view of the vending machine of FIG. 1.

As can be seen in FIG. 2 each of the food compartments 4 is a stand alone unit and may be removed, replaced and/or exchanged without disturbing the other compartments or there contents. In addition, the compartments may be filled or refilled in an appropriate environment (i.e.; a clean or sanitary room at the manufacturer's location) thereby eliminating the handling of the product itself at the point of use.

Each of the product storage compartments 4 are provided with compartment discharge means 32 which means control the flow of product out of the bottom opening 18 of the compartments 4. The product discharge means 32 is comprised of a cylindrical discharge housing 34 depending from the bottom of the product compartment 4 and completely covers the compartment opening 18 and a proportionator 20 which controls the flow and amount of product out of the vending machine.

The discharge housing 34 which is generally cylindrical in shape has a partition 36 formed integrally therein which divided the housing into two portions, a first portion 35 which is open to and communicates with the bottom compartment opening 18 allowing product to flow into the discharger housing 34 and a second portion 37 which is closed at the end of the housing adjacent to the compartment 4. The partition prevents product flowing through the discharge housing from passing into the closed portion 37 of the discharge housing.

The proportionator 20 is comprised of a rotor 40 containing a plurality of compartments 42 which rotor 40 is mounted for rotation within a proportionator housing 44 which housing depends from the above-referenced discharged housing 34. The proportionator housing 44 is open at the end directly adjacent to the discharge housing 34 such that product passing through said discharge housing 34 may pass into the compartments 42 of rotor 40. The proportionator housing 44 also defines an opening 46 at the opposite end thereof which opening communicates with chute 14 such that as a product containing rotor compartment 42 pass over said opening the product may flow through said opening 46 into said chute 14.

In a preferred embodiment of the present invention, the partition 38 is comprised of a flexible curtain 62 which is used to reduce damage to and crushing of product as the vending machine 1 is operated. As will be clear to one skilled in the art, the discharge housing 34 of the present invention will always (until compartment 4 is completely empty) contain product which will flow into a empty rotor compartment 42 as it is rotated under the bottom discharge opening 78 only to be replaced by addition product which will flow from the compartment 4 into the discharge housing 34 as the above referenced product flows into the rotor 20. As a result of this product still in the discharge housing 34 may be subject to forces generated by the rotation of the rotor 20 and transmitted by friction between the discrete products portions as they move in the rotor 20 thereby forcing some of the product into the partition 36. In the known vending machines, where the partition is inflexible, this may result in damage to the product. However in accordance with the present invention, a flexible curtain 62 is provide which forms a portion of said partition 36 so that if product is "pushed" into the partition the flexible curtain 62 "gives", the product may pass through said partition and fall down into another part of the rotor 20 to be ultimately discharged from the vending machine. The flexibility of the curtain 62 is selected to "give" only when a force sufficient to damage the product is generated. Under all other circumstances the curtain will act the same as the inflexible partition to retain product in the discharge housing until an empty rotor compartment is positioned under the discharge housing opening 78 to receive the product.

As with the known vending machines, each of the compartments 4 has associated therewith coin-operated actuation means, generally indicated as 24, which means controls the discharge of the food product contained within a particular food compartment. The coin-operated actuation means 24 is comprised of a rotatable handle 26, a coin slot 28, a spring loaded manually operated product door 30 and a coin box (not shown but is found within the housing 2 and collects the coins placed in the coin slot).

The handle 26, which is operable only after a coin has been inserted in the coin slot 28, is rotatable around a generally horizontal axis and is operably engaged with the rotor 20 contained in the proportionator housing 44, such that when the handle 26 is operated the rotor 20 rotates to position one of the rotor compartments 42 to receive product from the cylindrical discharge housing 34 and a second rotor compartment 42 is positioned over the bottom proportionator opening 46 to discharge any product contained therein into the chute 14 and through front opening 8 when product door 30 is manually opened.

Finally, the vending machine 1 of the present invention is provided with a security cover 48 which engages and is secured, by means of a standard key operated lock 50 provided along one side of the cover and by the insertion of the opposite side of the cover into a flange 58 formed on the housing 2, to the back of the discharge housing 4. The security cover has integrally formed thereon a plurality of pins 52 which engage the back of the housing 2 as well a the bottom of the compartment 4, through openings 54 provided in the housing 2 and the compartment 4, respectively. Also integrally formed on the cover is a plurality of flaps 60 which engage the chute 14 when the cover 48 is place on the vending machine. As a result of this arrangement, the compartments 4 and chutes 14 employed in the present invention can not be removed from the vending machine 1 without first removing the cover 48 thereby improving the tamper resistance of the vending machine 1 while still allowing for the easy interchange and/or replacement of compartments 4.

While various embodiments of the present invention have been disclosed above, it will be recognized by those skilled in the art that minor modifications of the present invention may be made without departing from the scope of the present invention. Therefore, the limits of the present invention are to be determined in view of the claims which follow.

What is claimed is:

1. A product vending machine comprising a generally rectangular dispenser housing defining at least one top opening and at least one front opening;

a rotatable handle having a generally horizontal axis of rotation mounted to the front of said housing adjacent to each front opening;

a product chute mounted inside said housing communicating between each of said at least one top openings and each of said front openings;

a product compartment removably engaged over each of said top openings, said product compartment defining an opening in the bottom thereof which compartment bottom opening communicates with said chute when said compartment is engaged over said top housing opening;

a proportionator joined to said product compartment and positioned between said compartment bottom opening and said chute, for discharging a discrete quantity of said product from said compartment into said chute, said proportionator being operably engaged with said handle and which proportionator acts as a cap over the product compartment bottom opening during transport;

means for preventing crushing of or damage to said product when discharged;

security means which, when installed on said machine, interlocks the compartments, chute and housing such that none of these components may be removed from the vending machine without removal of the security means;

wherein the security means comprises a security cover having integrally formed thereon a plurality of pins which engage the back of the housing as well as the bottom of the compartment, through openings provided in the housing and the compartment, respectively;

integrally formed on the cover is a plurality of flaps which engage the chute when the cover is placed on the vending machine; and whereby as a result of this arrangement, the compartments and chutes employed cannot be removed from the vending machine without first removing the cover thereby improving the tamper resistance of the vending machine while still allowing for the easy interchange and/or replacement of compartments.

2. The product vending machine of claim 1 wherein said proportionator is comprised of:

a proportionator housing with a first opening communicating with the compartment bottom opening and second opening communicating with said chute; and a rotor mounted for rotation within said housing, said rotor defining one or more compartments which receives product when positioned adjacent to said first housing opening and will discharge product into the chute when positioned adjacent to said second housing opening.

3. The product vending means of claim 1 wherein such preventing means is comprised of a discharge housing positioned between said compartment opening bottom and said proportionator, said discharge housing having a generally cylindrical shape and further having a partition formed integrally therein which divide the housing into two portions, a first portion which is open to and communicates with said compartment bottom opening allowing product to flow into said discharge housing and a second portion which is closed at the end of the housing adjacent to the compartment, which partition prevents product flowing through the discharge housing from passing into the closed portion of the discharge housing.

4. The product vending machine of claim 3 wherein a portion of said partition is flexible.

* * * * *